United States Patent
Purushothaman et al.

(10) Patent No.: US 11,550,925 B2
(45) Date of Patent: *Jan. 10, 2023

(54) INFORMATION SECURITY SYSTEM FOR IDENTIFYING POTENTIAL SECURITY THREATS IN SOFTWARE PACKAGE DEPLOYMENT

(71) Applicant: Bank of America Corporation, Charlotte, NC (US)

(72) Inventors: Sasidhar Purushothaman, Hyderabad (IN); Satish Kumar Kommineni, Hyderabad (IN); Ramesh Lakshmi Narayanan, Chennai (IN); Venkata Apparao Alla, Hyderabad (IN); Kyriacos Iacovou, Bayside, NY (US); Tarun Dixit, Noida (IN)

(73) Assignee: Bank of America Corporation, Charlotte, NC (US)

(*) Notice: Subject to any disclaimer, the term of this patent is extended or adjusted under 35 U.S.C. 154(b) by 127 days.

This patent is subject to a terminal disclaimer.

(21) Appl. No.: 17/210,667

(22) Filed: Mar. 24, 2021

(65) Prior Publication Data

US 2022/0309162 A1    Sep. 29, 2022

(51) Int. Cl.
*G06F 21/54* (2013.01)
*G06F 21/57* (2013.01)
*G06F 8/61* (2018.01)

(52) U.S. Cl.
CPC .............. *G06F 21/577* (2013.01); *G06F 8/62* (2013.01); *G06F 2221/033* (2013.01)

(58) Field of Classification Search
CPC ........ G06F 21/577; G06F 21/31; G06F 21/54; G06F 21/554; G06F 21/566; G06F 8/62; G06F 2221/033

USPC .......................................................... 726/22
See application file for complete search history.

(56) References Cited

U.S. PATENT DOCUMENTS

| | | | |
|---|---|---|---|
| 6,847,970 B2 | 1/2005 | Keller et al. |
| 6,868,441 B2 | 3/2005 | Greene et al. |
| 7,055,040 B2 | 5/2006 | Klemba et al. |
| 7,178,144 B2 | 2/2007 | Melchione et al. |
| 7,240,325 B2 | 7/2007 | Keller |
| 7,263,686 B2 | 8/2007 | Sadiq |
| 7,334,222 B2 | 2/2008 | Keller |

(Continued)

OTHER PUBLICATIONS

Purushothaman, S., "Information Security System For Identifying Security Threats In Deployed Software Package," U.S. Appl. No. 17/210,811, filed Mar. 24, 2021, 44 pages.

*Primary Examiner* — Jacob Lipman (57) ABSTRACT

A system for determining a software package for deployment based on a user request receives a request from the user to access software packages to perform a particular task. The system determines particular software packages for the user, based on an experience level of the user in performing the particular task. The system determines whether a security vulnerability is associated with the determined software packages by scanning the source code of the determined software package and searching for instances where a code portion includes open ports vulnerable to unauthorized access. If it is determined that no security vulnerability is associated with the determined software packages, the system deploys the determined software packages to a computing device from which the user sent the request.

20 Claims, 3 Drawing Sheets

(56) References Cited

U.S. PATENT DOCUMENTS

| | | |
|---|---|---|
| 7,340,491 B2 | 3/2008 | Campbell |
| 7,401,131 B2 | 7/2008 | Robertson et al. |
| 7,409,463 B2 | 8/2008 | Ramachandran |
| 7,496,911 B2 | 2/2009 | Rowley et al. |
| 7,496,912 B2 | 2/2009 | Keller et al. |
| 7,505,872 B2 | 3/2009 | Keller et al. |
| 7,761,851 B2 | 7/2010 | Bailey et al. |
| 7,827,549 B2 | 11/2010 | Tarassov |
| 7,937,685 B2 | 5/2011 | Weil et al. |
| 7,937,697 B2 | 5/2011 | Alberti et al. |
| 7,971,202 B2 | 6/2011 | Bell et al. |
| 8,037,471 B2 | 10/2011 | Keller et al. |
| 8,099,728 B2 | 1/2012 | Marinelli et al. |
| 8,099,758 B2 | 1/2012 | Schaefer et al. |
| 8,181,253 B1 * | 5/2012 | Zaitsev ............... H04L 63/1433 726/1 |
| 8,195,502 B2 | 6/2012 | Hilkemeyer et al. |
| 8,327,351 B2 | 12/2012 | Paladino et al. |
| 8,429,630 B2 | 4/2013 | Nickolov et al. |
| 8,468,244 B2 | 6/2013 | Redlich et al. |
| 8,473,468 B2 | 6/2013 | Pace et al. |
| 8,566,115 B2 | 10/2013 | Moore |
| 8,578,371 B2 | 11/2013 | Celli et al. |
| 8,661,406 B2 | 2/2014 | Shapiro |
| 8,666,933 B2 | 3/2014 | Pizzorni et al. |
| 8,813,063 B2 | 8/2014 | Uthe |
| 8,850,507 B2 | 9/2014 | Reisman |
| 8,914,783 B2 | 12/2014 | Van Camp |
| 8,935,658 B2 | 1/2015 | Shapiro |
| 9,037,642 B2 | 5/2015 | Malik et al. |
| 9,072,972 B2 | 7/2015 | Ahiska et al. |
| 9,081,747 B1 | 7/2015 | Tabieros et al. |
| 9,348,573 B2 | 5/2016 | Lightner et al. |
| 9,696,791 B2 | 7/2017 | Stirbu et al. |
| 9,729,315 B2 | 8/2017 | Statica et al. |
| 9,753,865 B2 | 9/2017 | Kiperberg et al. |
| 9,923,918 B2 | 3/2018 | Nicodemus et al. |
| 10,104,053 B2 | 10/2018 | Wipfel et al. |
| 10,127,033 B2 | 11/2018 | Gross et al. |
| 10,203,946 B2 | 2/2019 | DeHaan |
| 10,411,975 B2 | 9/2019 | Martinez et al. |
| 10,484,429 B1 * | 11/2019 | Fawcett ................. H04L 63/20 |
| 10,797,997 B2 | 10/2020 | Kwon et al. |
| 10,872,077 B2 | 12/2020 | Wright, Sr. |
| 2007/0180490 A1 * | 8/2007 | Renzi .................. G06F 21/604 726/1 |
| 2010/0299305 A1 * | 11/2010 | Laxman .................. G06F 8/71 707/805 |
| 2014/0222686 A1 | 8/2014 | Levin et al. |
| 2017/0177468 A1 | 6/2017 | Thangamani et al. |
| 2018/0225584 A1 | 8/2018 | Brown et al. |

* cited by examiner

INFORMATION SECURITY SYSTEM FOR IDENTIFYING POTENTIAL SECURITY THREATS IN SOFTWARE PACKAGE DEPLOYMENT

TECHNICAL FIELD

The present disclosure relates generally to software package deployment, and more specifically to an information security system for identifying potential security threats in software package deployment.

BACKGROUND

It is challenging to verify software packages in a deployment process using current software package deployment monitoring and verifying technologies. Some of the software packages selected to be deployed may contain security vulnerabilities that make the software packages and receiving computer systems vulnerable to security threats. Furthermore, a software package selected to be deployed may not be compatible with other software packages resident on the receiving computer systems. Furthermore, deployed software packages may not be compliant with user requirements to perform a task. Current technologies of verifying software package deployment are based on manual confirmations in a quality checking process. The auditing of software deployments using existing technologies is reactive and costly in terms of time, processing, and memory resources. Current software package deployment and information security technologies are not configured to verify whether software packages comply with user requirements, or contain security vulnerabilities.

SUMMARY

Current software package deployment and information security technologies are not configured to provide a reliable and efficient solution to determine software packages for deployment based on a user request and/or to detect security vulnerabilities in software package deployment. This disclosure contemplates systems and methods for determining software packages for deployment based on a user request. This disclosure further contemplates systems and methods for detecting security vulnerabilities in a software package before deployment, and update and/or revise the software packages. This disclosure further contemplates systems and methods for detecting security vulnerabilities in software packages after deployment, and in response, recall deployed software packages infected with security vulnerabilities.

The disclosed system receives a request from a user to access software packages to perform a particular task. In some examples, the particular task may be related to web application development, software application development, mobile application development, firewall configuration, network security, production maintenance, accounting, among others.

The disclosed system identifies the user based on their user login credentials, and fetches a user profile associated with the use. From the user profile, the disclosed system determines the experience level of the user in performing the particular task. For example, the user profile may indicate that the user has an 8 out of 10 experience level in performing the particular task. As such, the experience level of the user may indicate whether the user is a non-technical user, a technical user, a call support user, a mid-level developer, a senior-level developer, etc.

The disclosed system selects one or more particular software packages from a plurality of software packages that are labeled with the particular task and the experience level of the user. In this process, the disclosed system may determine classifications of software packages in terms of technologies they are used for. For example, the disclosed system may classify a first set of software packages that are used for web application development into a web application development technology class. In another example, the disclosed system may classify a second set of software packages that are used for network security into a network security technology class. Similarly, the disclosed system may classify other software packages into their corresponding technology class.

Furthermore, the disclosed system may determine classifications of software packages in terms of the experience level of users who historically used those software packages. For example, the disclosed system may classify a first set of software packages that historically were used by users with an average experience level of 8 out of 10, into the 8 out of 10 experience level class. Similarly, the disclosed system may classify other software packages in their corresponding experience level class.

In this manner, the disclosed system may select particular software packages that belong to the same technology class related to the particular task (e.g., web application development technology class, network security technology class, etc.), and the same experience level class of users whose experience levels correspond to (or within a threshold range of, e.g., ±1, ±2, etc. of) the experience level of the user (e.g., 8 out 10 experience level class).

In some examples, the disclosed system may determine whether to allocate an open-source or licensed software package to users based on their user profile and the particular task. For example, assume the user is a non-technical user or a call support user (e.g., has an experience level of 2 out of 10 in developing web applications), and the user is requesting to access a software package to develop a web application. In such cases, the disclosed system may select an open-source software package over a licensed software package used for web application development to allocate the licensed software package for technical users with experience levels above a threshold level (e.g., 7 out 10 experience level) in developing web applications.

In another example, assume that the user is a technical user or a senior-level web developer (e.g., has an experience level of 8 out of 10 in developing web applications), and the user is requesting to access a software package to develop a web application. In such cases, the disclosed system may select a licensed software package over an open-source software package used for web application development. One reason for this approach is to reduce the probability of introducing a security vulnerability by using the open-source software package, because the source code of the open-source software package is available to the public, and there is a high probability that an outsider intentionally or inadvertently has infected the source code of the open-source software package with a security vulnerability. Some of the examples of security vulnerabilities may include using an open communication port that is vulnerable to unauthorized access, hard-coding login credentials to a server, a database, a user, hard-coding confidential information, such as encryption keys, among others.

The disclosed system determines whether the particular software packages are associated with security vulnerabilities, including those listed above. In this process, the disclosed system scans the source code of the particular software packages, and searches for instances of code portions where security vulnerabilities, including those listed above, are included. If the disclosed system determines that there is no security vulnerability associated with the particular software packages, the disclosed system deploys the particular software packages to the computing device from which the user sent the request. Otherwise, the disclosed system may recall or remotely uninstall the particular software packages from the computing device.

With respect to detecting security vulnerabilities in software packages before deployment, in one embodiment, a system for determining a software package for deployment based on a user request comprises a memory and a processor. The memory is operable to store a plurality of software packages comprising at least one of one or more open-source software packages and one or more licensed software packages. The processor is operably coupled with the memory. The processor receives a request to access software packages to perform a particular software development task during a first login session associated with a user. The particular software development task comprises at least one of developing a web application and developing a software application. The processor fetches, from a database, a user profile associated with the user. The user profile comprises an experience level associated with the user in performing the particular task. The processor determines, based on the particular software development task and the experience level of the user performing the particular software development task, one or more particular software packages, from the plurality of software packages, that are used for performing the particular software development task and historically used by users with the experience level. Each of the determined one or more particular software packages is configured to be used for performing the particular software development task. The processor determines whether a security vulnerability is associated with the one or more particular software packages. In this process, the processor scans the source code of the one or more particular software packages, and determines if a portion of the source code includes open ports vulnerable to unauthorized access. In response to determining that no security vulnerability is associated with the one or more particular software packages, the processor deploys the one or more particular software packages to a computing device associated with the user.

With respect to detecting security vulnerabilities in software packages after deployment, in one embodiment, a system for detecting security vulnerabilities in deployed software packages comprises a memory and a processor. The memory is operable to store a plurality of software packages comprising at least one of one or more open-source software packages and one or more licensed software packages. The memory further stores a user profile associated with a user, wherein the user profile comprises an experience level associated with the user in performing a particular software development task. The particular software development task comprises at least one of developing a web application and developing a software application. The processor is operably coupled with the memory. The processor receives a request to access software packages to perform a particular software development task during a first login session associated with the user. The processor selects one or more particular software packages from the plurality of software packages, based at least in part upon the particular software development task and the experience level of the user in performing the particular software development task. The processor deploys the one or more particular software packages to a computing device associated with the user. The processor monitors the one or more particular software packages. While monitoring the one or more particular software packages, the processor determines whether a security vulnerability is introduced to the computing device by the one or more particular software packages. In this process, the processor scans source code of the one or more particular software packages, and determines if a portion of the source code includes an open communication port vulnerable to unauthorized access. In response to determining that the security vulnerability is introduced to the computing device by the one or more particular software packages, the processor recalls the one or more particular software packages from the computing device such that the one or more particular software packages are uninstalled from the computing device.

The disclosed system provides several practical applications and technical advantages which include: 1) technology that determines one or more particular software packages in response to receiving a request from a user to access software packages to perform a particular task based on an experience level of the user in performing the particular task and the particular task; 2) technology that detects security vulnerabilities in source code of the one or more particular software packages (determined to be deployed) by scanning their source code to search for instances where a security vulnerability is used; 3) technology that deploys the particular software packages by communicating to and remotely installing the particular software packages on a computing device from which the user sent the request; 4) technology that monitors the performance of the deployed software packages to determine whether the speed of deployed software packages in performing the particular task is reduced below a threshold percentage, and recalls or remotely uninstalls the deployed software packages if the performance of the deployed software packages is reduced below the threshold percentage; 5) technology that monitors the deployed software packages to determine whether any security vulnerability is introduced by the deployed software packages, and remotely installs a security patch on the computing device to address security vulnerability; and 6) technology that upon determining that a security vulnerability is introduced by the deployed software packages, recalls the deployed software packages.

As such, the disclosed system may improve the current software package deployment and information security technologies. For example, the disclosed system may determine whether there is any security vulnerability associated with the software packages before and after deployment, as described above. For example, before deployment, the disclosed system determines whether any security vulnerability is associated with the selected software packages. In response to determining that any security vulnerability is associated with the selected software packages, the disclosed system revises the selected software packages until the updated selected software packages are free of security vulnerabilities. In another example, after deployment, the disclosed system monitors the deployed software packages and determines whether any security vulnerability is introduced by the deployed software packages. In response to determining that any security vulnerability is introduced by the deployed software packages, the disclosed system remotely installs a security patch to address security vulnerability and/or remotely uninstalls the deployed software packages.

Accordingly, the disclosed system may be integrated into a practical application of securing data stored in files associated with software packages (e.g., source code, library files, dependency files, etc.) and files stores in the memory of a computing device to which the software packages are deployed from unauthorized access, e.g., from outsiders. For example, by detecting security vulnerabilities associated with the software packages, and recalling the software packages, outsiders may not be able to access the computing device. As such, the data stored in files associated with deployed software packages and files stores in the computing device are kept secured from data extraction, exfiltration, modification, destruction, etc. Furthermore, the deployed software packages and the computing device are kept secured from malicious code or data that an outsider could use to infect the computing device and the deployed software packages, if a security vulnerability in a deployed software package had otherwise remained undetected. This, in turn, provides an additional practical application of protecting uninfected software packages and files stored in the computing device. The disclosed system may further be integrated into an additional practical application of improving underlying operations of the computing devices to which the software packages are deployed, for example, by securing deployed software package, the computing devices are kept secure from unauthorized access.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions for security threat and security vulnerability detection in software package deployment. This disclosure provides various systems and methods for security threat and security vulnerability detection in software package deployment. In one embodiment, a system 100 and method 200 for detecting security threat and security vulnerability issues before software package deployment are described in FIGS. 1 and 2, respectively. In one embodiment, system 100 and method 300 for detecting security threat and security vulnerability issues after software package deployment are described in FIGS. 1 and 3, respectively.

Figure 1:
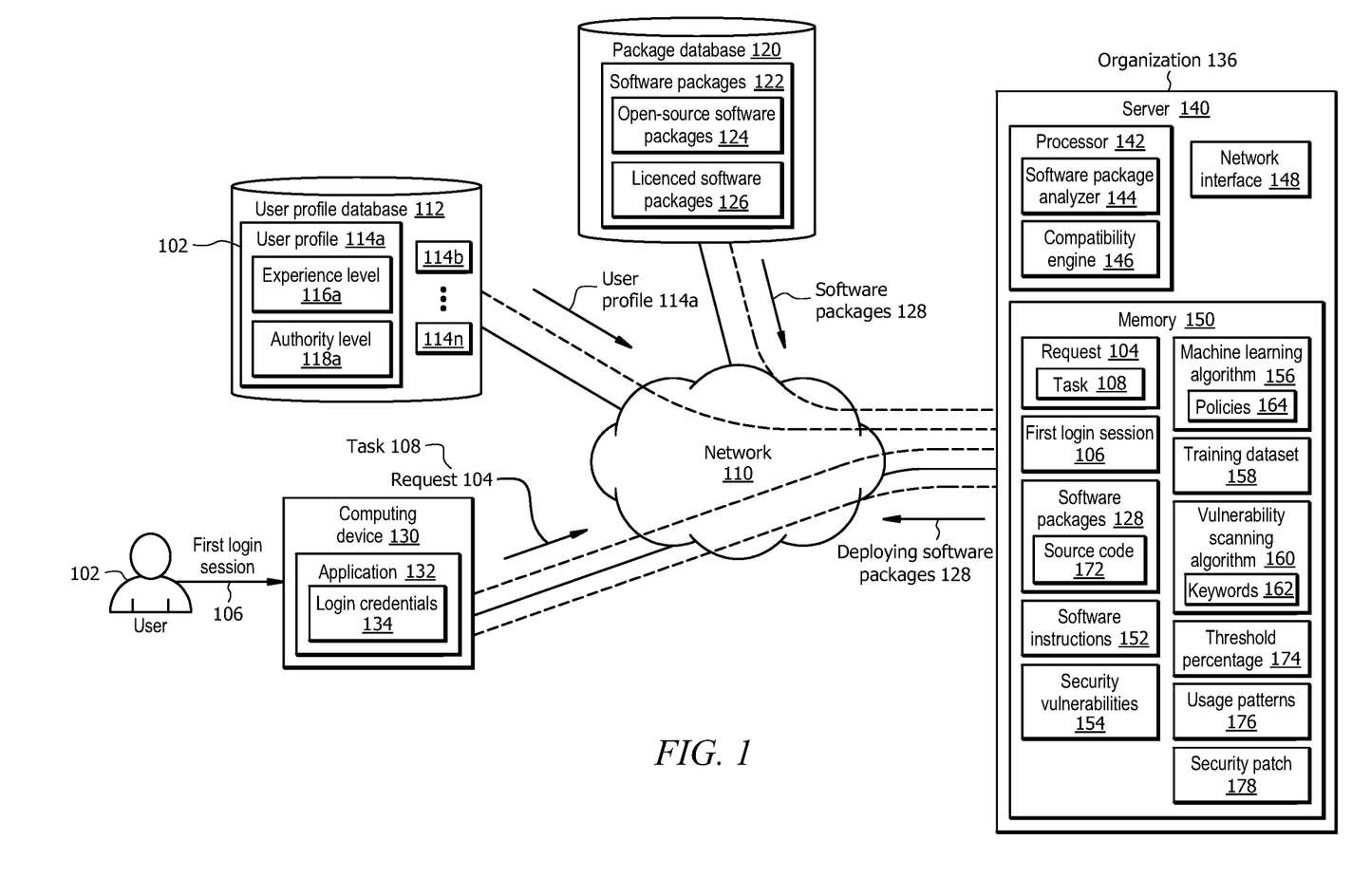
FIG. 1 illustrates an embodiment of a system configured to detect security vulnerabilities in software package deployment.

Example System for Detecting Security Vulnerabilities Before and After Software Package Deployment FIG. 1 illustrates one embodiment of a system 100 that is configured to detect security vulnerabilities 154 in software package deployment and distribution. In one embodiment, system 100 comprises a server 140. In some embodiments, system 100 may further comprise a user profile database 112, a package database 120, a computing device 130, and a network 110. Network 110 enables communications between components of the system 100. Server 140 comprises a processor 142 in signal communication with a memory 150. Memory 150 comprises software instructions 152 that when executed by the processor 142 cause the processor 142 to perform one or more functions described herein. For example, when the software instructions 152 are executed, the processor 142 executes a software package analyzer 144 and compatibility engine 146 to: 1) identify one or more particular software packages 126 based on a request 104 received from a user 102 and a user profile 114a associated with the user 102; 2) determine whether there is a security vulnerability 154 associated with the one or more particular software packages 126; and 3) deploy the one or more particular software packages 126 to a computing device 130 from which the request 104 is received. The user profile database 112 and package database 120, respectively, store user profiles 114 and software packages 122 that provide information that may be used by the software instructions 152 and/or the processor 142. In other embodiments, system 100 may not have all of the components listed and/or may have other elements instead of, or in addition to, those listed above.

In general, system 100 (via the software package analyzer 144) receives a request 104 from the user 102 operating the computing device 130 to access one or more software packages 122 to perform a particular task 108. For example, the particular task 108 may comprise developing a web application, developing a software application, developing a mobile application, configuring firewall protocols in network infrastructure, or any other task that employees of an organization 136 may perform. The software package analyzer 144 fetches, from the user profile database 112, a user profile 114a that is associated with the user 102. The user profile 114a may comprise an experience level 116a associated with the user 102 in performing the particular task 108. The user profile 114a may further comprise an authority level 118a that indicates a position or role of the user 102 in the organization 136. In a particular example, the user profile 114a may indicate that the user 102 is a mid-level developer employee (i.e., authority level 118a), and have a 6 out of 10 experience level 116a in performing the particular task 108. The software package analyzer 144 determines one or more particular software packages 128 to be deployed to the computing device 130 based on the information provided in the user profile 114a (e.g., the experience level 116a and authority level 118a) and the request 104 (e.g., the particular task 108). In this process, the software package analyzer 144 determines the one or more particular software packages 128 that are used for performing the particular task 108 and historically used by users 102 with the experience level 116a. The compatibility engine 146 determines whether a security vulnerability 154 is associated with the one or more particular software packages 128. For example, the compatibility engine 146 scans the source code of the one or more particular software packages 128, and determines whether any code portion in the source code comprises an open communication port that makes the one or more particular software packages 128 vulnerable to unauthorized access. In response to determining that no security vulnerability 154 is associated with the one or more particular software packages 128, the compatibility engine 146 deploys the one or more particular software packages 128 to the computing device 130. As such, system 100 is configured to detect security vulnerabilities 154 before deploying software packages 128. This process is described in FIGS. 1 and 2. System 100 is further configured to detect security vulnerabilities 154 in deployed software packages 128. This process is described in FIGS. 1 and 3.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

User profile database 112 generally comprises any storage architecture. Examples of the user profile database 112, include, but are not limited to, a network-attached storage cloud, a storage area network, a storage assembly directly (or indirectly) coupled to one or more components of the system 100. The user profile database 112 stores user profiles 114 that are associated with users 102 or employees of the organization 136, including the user profiles 114a, 114b, . . . , 114n. For example, the user profile 114a is associated with the first user 102, user profile 114b is associated with a second user 102, and user profile 114n is associated with a third user 102. Each user profile 114 comprises the experience level 116 and authority level 118 associated with a user 102. For example, the user profile 114a comprises the experience level 116a and authority level 118a associated with the first user 102.

The experience level 116 may indicate a corresponding experience that the user 102 has in performing the particular task 108. For example, the experience level 116 may indicate the corresponding experience of the user 102 in performing the particular task 108 on a scale of 1 to 10, where 10 is the highest experience level 116. Each user profile 114 may comprise various experience levels 116 with respect to various tasks 108. For example, assuming that the first task 108 is developing a software application, and the user 102 is a non-technical employee at the organization 136, a first experience level 116a may indicate that the user 102 has a low experience level 116a (e.g., 1 out of 10) in performing the first task 108. In another example, assuming that the second task 108 is configuring firewall protocols in a network infrastructure, and the user 102 is a senior employee in software development who has not worked on any firewall configuration project, a second experience level 116a may indicate that the user 102 has a low experience level 116a (e.g., 1 out of 10) in performing the second task 108. In another example, assuming that the third task 108 is developing a web application, and the user 102 is a senior web developer at the organization 136, a third experience level 116a may indicate that the user 102 has a high experience level 116a (e.g., 9 out of 10) in performing the third task 108.

The authority level 118 may indicate a corresponding role or position of the user 102 in the organizational hierarchy. For example, the authority level 118 may indicate that a user 102 is a manager in a web development group, a mid-level employee in mobile development group, a technical support employee in the production department, call support employee, non-technical employee, or any other position at the organization 136.

Package database 120 generally comprises any storage architecture. Examples of the package database 120 include, but are not limited to, a network-attached storage cloud, a storage area network, a storage assembly directly (or indirectly) coupled to one or more components of the system 100. The package database 120 stores software packages 122. Each of the software packages 122 may be related to a different task 108, such as developing a web application, software application, configuring firewall protocols in a network infrastructure, etc. For example, the first set of software packages 122 may include programming language packages, including Java, C++, Python, etc. that can be used to perform one or more tasks 108. In another example, a second set of software packages 122 may include command-line interfaces or Integrated Development Environments (IDEs) for programming in different programming languages. In another example, a third set of software packages 122 may include word processing tools, including Word, PowerPoint, etc.

The software packages 122 may include open-source packages software 124 and licensed software packages 126. The open-source software packages 124 may include source code that is available to the public. For example, an open-source software package 124 are software packages whose source code is made accessible by its developers to the public by including the source code on a public website repository, e.g., GitHub website. In this regard, open-source software packages 124 may be accessed by an outsider, and edited to include a security vulnerability 154. For example, an outsider may intentionally or inadvertently use a weak user authentication function in a source code of an open-source software package 124 such that the open-source software package 124 becomes vulnerable to unauthorized access. In another example, an outsider may intentionally or inadvertently use less-than-perfect coding practices in a source code of an open-source software package 124 such that a source of security vulnerability 154 is introduced to the source code of the open-source software package 124.

In some example, the security vulnerabilities 154 may include using communication ports that are open to the public allowing unauthorized access, using weak/inadequate encryption methods allowing an encrypted key to be easily decrypted, for example, by brute-force attacks, weak/inadequate validation methods allowing for unauthorized access, including non-parametrized query statements allowing for query injections or cyberattacks, hard-coding a login credential of a server, a database, a user, hard-coding confidential information, such as customer data, credit card number, etc., among others. The licensed software packages 126 are proprietary software packages whose source code is not made available to the public.

In some cases, a security vulnerability 154 may be introduced by combining at least two software packages 122. For example, assume that each of a first software package 122 and a second software package 122 is not associated with a security vulnerability 154. Also, assume that a code portion in a source code of the first software package 122 in combination with a code portion in a source code of the second software package 122 introduce a security vulnerability 154, such as a connection port (e.g., a Web Socket port), which will be open to the public allowing unauthorized access. As such, in this example, combining the first and second software packages 122 introduced a security vulnerability 154, even though each of the first and second security vulnerability 154 is not associated with a security vulnerability 154. The software package analyzer 144 and compatibility engine 146 are configured to detect any security vulnerability 154 listed above, including security vulnerabilities 154 associated with each software package 122 and security vulnerabilities 154 introduced by combining at least two software packages 122, as described further below.

Computing device 130 is generally any device that is configured to process data and interact with users 102. Examples of computing device 130 include, but are not limited to, a personal computer, a desktop computer, a workstation, a server, a laptop, a tablet computer, a mobile phone (such as a smartphone), etc. The user 102 may send the request 104 to access one or more software packages 122 to perform a particular task 108 from the computing device 130. In some examples, the computing device 130 may not have an operating system (e.g., Windows, Ubuntu, etc.) installed. As such, in such examples, the user 102 may further specify an operating system to be installed on the computing device 130 along with the software packages 128. For example, the user may send the request 104 using an interface application 132 that is available on the computing device 130. The user 102 may log in to the interface application 132 by providing their login credentials 134. Upon authenticating the user 102 using their login credentials 134, the software package analyzer 144 determines the identity of the user 102, and fetches the user profile 114*a* that is associated with the user 102. Further, upon authenticating the user 102 using their login credentials 134, a login session 106 of the user 102 is initiated.

The interface application 132 may be a software, mobile, and/or a web application 132, and is generally configured to provide an interface so that the user 102 is able to specify the request 104. For example, the interface application 132 may comprise interfaces such as one or more text fields, selection buttons, etc. by which the user 102 can specify a particular operating system (e.g., Windows, Ubuntu, etc.). In another example, the user 102 may select one or more buttons to indicate that the software package needs to perform the particular request 104 (e.g., a Java software package, a command-line interface for programming in Java, word processing tools, etc.). In another example, the user 102 may select a "web development" button on the interface application 132 to indicate that the particular task 108 is related to web development. Similarly, the user 102 may select any other button on the interface application 132 to indicate a corresponding particular task 108. The interface application 132 is communicatively coupled with the server 140 (via the software package analyzer 144 and compatibility engine 146). As such, when the user 102 specifies the particular task 108 on the interface application 132, the interface application 132 communicates the request 104 indicating the particular task 108 to the server 140.

Server

Server 140 is generally a server or any other device configured to process data and communicate with computing devices (e.g., computing devices 130), and databases (e.g., user profile database 112 and package database 120), systems, domains, etc. via the network 110. In one example, server 140 may be a backend server associated with the organization 136, and is generally configured to oversee operations of the processor 142 as described further below. For example, the server 140 is configured to oversee deployment and distribution of software packages 128 to computing devices 130 by analyzing tasks 108 indicated in requests 104 from users 102, and user profiles 114.

Processor 142 comprises one or more processors operably coupled to the memory 150. The processor 142 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 152) to implement the software package analyzer 144 and compatibility engine 146. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more steps of methods 200 and 300 as described in FIGS. 2 and 3, respectively.

Network interface 148 is configured to enable wired and/or wireless communications (e.g., via network 110). The network interface 148 is configured to communicate data between the server 140 and other devices (e.g., computing devices 130), databases (e.g., user profile database 112 and package database 120), systems, and domains. For example, the network interface 148 may comprise a WIFI interface, a local area network (LAN) interface, a wide area network (WAN) interface, a modem, a switch, or a router. The processor 142 is configured to send and receive data using the network interface 148. The network interface 148 may be configured to use any suitable type of communication protocol as would be appreciated by one of ordinary skill in the art.

Memory 150 may be volatile or non-volatile and may comprise a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. Memory 150 is operable to store the software instructions 152, security vulnerabilities 154, request 104, first login session 106, software packages 128, machine learning algorithm 156, training dataset 158, vulnerability scanning algorithm 160, threshold percentage 174, usage patterns 176, security patch 178, and/or any other data or instructions. The software instructions 152 may comprise any suitable set of instructions, logic, rules, or code operable to execute the processor 142.

Package Analyzer Engine

Software package analyzer 144 may be implemented by the processor 142 executing software instructions 152, and is generally configured to identify one or more particular software packages 128 for the user 102, in response to receiving the request 104 to perform a particular task 108. In one embodiment, the software package analyzer 144 may be implemented using a machine learning algorithm 156, such as support vector machine, neural network, random forest, k-means clustering, etc.

In one embodiment, the software package analyzer 144 may be configured to select one or more particular software packages 128 according to policies 164 that are built-in to the machine learning algorithm 156. In one example, a first policy 164 may indicate do not select software packages 122 that are historically used by technical users 102 (e.g., developers), such as programming language software packages 122, for users 102 whose user profiles 114 indicate that they are non-technical users 102 (e.g., call support users 102). In another example, a second policy 164 may indicate do not select from a particular type of software package 122 more than once. For example, if a Java software package 128 is already included in the one or more particular software packages 128 to be deployed, the second policy 164 indicates do not select another Java software package 128. In another example, a third policy 164 may indicate that if an open-source software package 124 and a licensed software package 126 can be selected for a user 102 whose experience level 116 is above a threshold level (e.g., 8 out of 10), select the licensed software package 126 for the user 102. In another example, a fourth policy 164 may indicate that if an open-source software package 124 and a licensed software package 126 can be selected for a user 102 whose experience level 116 is below a threshold level (e.g., 4 out of 10), select the open-source software package 126 for the user 102.

In one embodiment, the software package analyzer 144 may be implemented by a supervised machine learning algorithm 156. For example, to determine a corresponding software package 128 for the user 102 based on the user profile 114a and the task 108 indicated in the request 104, the software package analyzer 144 may be trained by a training dataset 158. The training dataset 158 may include a set of software packages 122 each labeled with a type of the software package 122 (e.g., open-source or licensed), an experience level 116 associated with users 102 who historically used the software package 122 (e.g., scale of 1 to 10), and a technology that it is used for (e.g., web application development, software application development, mobile application development, firewall configuration, network security, production maintenance, accounting, etc.).

With respect to classifying software packages 122 in terms of a type of each software package 122, the software package analyzer 144 may classify each software package 122 as open-source class or licensed class.

With respect to classifying software packages 122 in terms of an experience level 116 associated with user 102 who historically used the software packages 122, the software package analyzer 144 may classify each software package 122 into a corresponding class of experience level 116 (e.g., 1 out of 10 class, 2 out of 10 class, etc.), that each software package 122 belongs to.

With respect to classifying software packages 122 in terms of a technology that each software package 122 is used for, the software package analyzer 144 may classify each software package 122 into a corresponding technology class, such as web application development class, software application development class, mobile application development class, firewall configuration class, network security class, production maintenance class, accounting class, etc.

In one embodiment, the classifications of the software packages 122 discussed above may be confirmed, updated, or overwritten by an operator. As such, in one embodiment, the software package analyzer 144 may be implemented by a supervised and/or semi-supervised machine learning algorithm 156.

Compatibility Engine

Compatibility engine 146 may be implemented by the processor 142 executing software instructions 152, and is generally configured to determine whether one or more software packages 128 (determined by the software package analyzer 144) are associated with a security vulnerability 154. In one embodiment, the compatibility engine 146 may be implemented by a vulnerability scanning algorithm 160 that is configured to scan or parse source code 172 of the software packages 128 and determine whether any code portion of the source code 172 of the software packages 128 includes a security vulnerability 154. For example, the vulnerability scanning algorithm 160 may include text processing (e.g., natural language processing), code processing, or any other data format processing method for analyzing the source code 172. In this process, the compatibility engine 146 (using the vulnerability scanning algorithm 160) may scan the source code 172 to find keywords 162 associated with security vulnerabilities 154. In some examples, the keywords 162 may be associated with methods or functions that may cause security vulnerabilities 154, such as open communication ports vulnerable to unauthorized access, weak/inadequate encryption methods, weak/inadequate validation methods, etc.

During scanning the source code 172, if the compatibility engine 146 finds an instance where a code portion in the source code 172 includes at least one keyword 162 that is associated with a particular security vulnerability 154, the compatibility engine 146 determines that the software package 128 is associated with the particular security vulnerability 154. Otherwise, the compatibility engine 146 determines that the software package 128 is not associated with a security vulnerability 154. In this manner, the compatibility engine 146 determines whether any code portion of the source code 172 of the software packages 128 includes a security vulnerability 154.

The compatibility engine 146 may further be configured to determine whether the software packages 128 are compatible with each other. The compatibility engine 146 determines that a first software package 128 is not compatible with a second software package 128, if, for example, the first software package 128 crashes above a threshold percentage of number of times when the second software package 128 is used in conjunction with the first software package 128.

Operational Flow

The operational flow of the system 100 begins when the server 140 receives a request 104 from the user 102 to access software packages 122 to perform a particular task 108 during a first login session 106. In this process, the user 102 logs into the application 132 using their login credentials 134, and specifies a particular operating system and software needs (e.g., software packages 122) to perform the particular task 108 by interacting with interfaces and selection buttons in the application 132, similar to that described above. The first login session 106 is recorded when the user 102 logs in to the application 132.

The software package analyzer 144 identifies the user 102 using the login credentials 134. The software package analyzer 144 fetches the user profile 114a associated with the user 102. The software package analyzer 144 analyzes the request 104 and the user profile 114a to determine one or more particular software packages 128 for the user 102 to perform the particular task 108. In this process, by analyzing the request 104, the software package analyzer 144 determines a technology of the particular task 108, e.g., web application development, software application development, etc. Further in this process, by analyzing the user profile 114a, the software package analyzer 144 determines the experience level 116a and authority level 118a of the user 102.

Based on the request 104 and user profile 11a, the software package analyzer 144 identifies or determines one or more software packages 122 that are in the same experience level class as the user 102, and technology class as the particular task 108.

Determining Whether the Software Packages are Associated with a Security Vulnerability Once the software package analyzer 144 determines the one or more particular software packages 128, the compatibility engine 146 determines whether the one or more particular software packages 128 are associated with a security vulnerability 154, similar to that described above. If the compatibility engine 146 determines that a security vulnerability 154 is associated with one or more particular software packages 128, the compatibility engine 146 sends a message to the software package analyzer 144 indicating that the one or more particular software packages 128 are associated with a security vulnerability 154, and the software package analyzer 144 needs to determine a new one or more particular software packages 128. The compatibility engine 146 may continue analyzing the one or more particular software packages 128 determined by the software package analyzer 144, until the compatibility engine 146 determines that no security vulnerability is associated with the determined one or more particular software packages 128.

Determining Whether the Software Packages are Compatible with Each Other

In some cases where two or more particular software packages 128 are determined by the software package analyzer 144, the compatibility engine 146 also determines whether each software package 128 is compatible with other software packages 128, similar to that described above. The compatibility engine 146 may continue analyzing the particular software packages 128 determined by the software package analyzer 144, until the compatibility engine 146 determines that each software package 128 is compatible with other software packages 128.

Deploying the Software Packages

Upon determining that the software packages 128 are free of security vulnerabilities 154 and they are compatible with each other, the compatibility engine 146 deploys the software packages 128 to the computing device 130. In the deployment process, the compatibility engine 146 may bundle binary files, library files, drivers, and dependencies of the one or more particular software packages 128 in a container or a container image.

In one embodiment, in the deployment process, the compatibility engine 146 communicates the software packages 128 to the computing device 130, and remotely installs the software packages 128 on the computing device 130.

In an alternative embodiment, in the deployment process, the compatibility engine 146 establishes a communication path between a remote computing device on which the software packages 128 are installed (e.g., a virtual machine) and the computing device 130. As such, the user 102 can access the one or more software packages 128 from the computing device 130.

Monitoring the Deployed Software Packages

During the first login session 106, the compatibility engine 146 monitors the performance and efficiency of the deployed software packages 128. In this process, the compatibility engine 146 may monitor the speed, CPU utilization usage, memory utilization usage, and other performance parameters of deployed software packages 128. The compatibility engine 146 may determine whether the performance of a deployed software package 128 is reduced below a threshold percentage 174 (e.g., below 80%, 85%, etc.). If the compatibility engine 146 determines that the performance of the deployed software package 128 is reduced below the threshold percentage 174, the compatibility engine 146 may send a message to the user 102 operating the computing device 130 indicating that the performance of the deployed software package 128 is reduced below the threshold percentage 174, and/or recall or remotely uninstall the deployed software package 128.

In one embodiment, the compatibility engine 146 may determine whether any of the deployed software packages 128 is not updated, then the compatibility engine 146 may update the deployed software packages 128 to the latest version of those software packages 128.

In one embodiment, the compatibility engine 146 may determine whether a security vulnerability 154 is introduced to the computing device 130 from the deployed software packages 128, for example, by scanning files stored in a memory of the computing device 130, and looking for keywords 162, similar to that described above. If the compatibility engine 146 determines that a security vulnerability 154 is introduced to the computing device 130 from the deployed software packages 128, the compatibility engine 146 may send a message to the user 102 operating the computing device 130 indicating that the security vulnerability 154 is detected in the computing device 130, and recall or remotely uninstall the deployed software packages 128. In one embodiment, the compatibility engine 146 may remotely install a security patch 178 in the computing device 130 to address the detected security vulnerability 154.

In one embodiment, upon detecting a reduced performance of the deployed software packages 128 and/or a security vulnerability 154 introduced by the deployed software packages 128, the compatibility engine 146 may terminate the first login session 106, and disable operations of the computing device 130.

In one embodiment, the compatibility engine 146 keeps track of usage patterns 176 of the deployed software packages 128. In this process, the compatibility engine 146 may record timestamps when each of the deployed software packages 128 is being used. The compatibility engine 146 may determine whether a deployed licensed software package 128 is being used by the user 102 above a threshold period of time (e.g., above five hours, or any other suitable duration). If the compatibility engine 146 determines that the deployed licensed software package 128 is being used below the threshold period of time, the compatibility engine 146 may recall the deployed licensed software package 128, so that it can be allocated to other users 102 who request to access that licensed software package 128.

Initiating a Second Login Session for the User

To initiate the second login session 106, the user 102 may log in to the application 132 using their login credentials 134, and specify a particular operating system and software needs (e.g., software packages 122) to perform the particular task 108. The software package analyzer 144 may determine whether the experience level 116a associated with the user 102 has changed. If the software package analyzer 144 determines that the experience level 116a has changed, the software package analyzer 144 updates the one or more particular software packages 128 that were deployed for the user 102 during the first login session 106, to reflect the detected change experience level 116a.

The compatibility engine 146 analyzes the updated one or more particular software packages 128 to determine whether they are compatible with each other, and whether there is a security vulnerability 154 associated with them, similar to that described above. In response to determining that the updated one or more particular software packages 128 are compatible with each other and there is no security vulnerability 154 associated with them, the compatibility engine 146 deploys the updated one or more particular software packages to the computing device 130.

Figure 2:
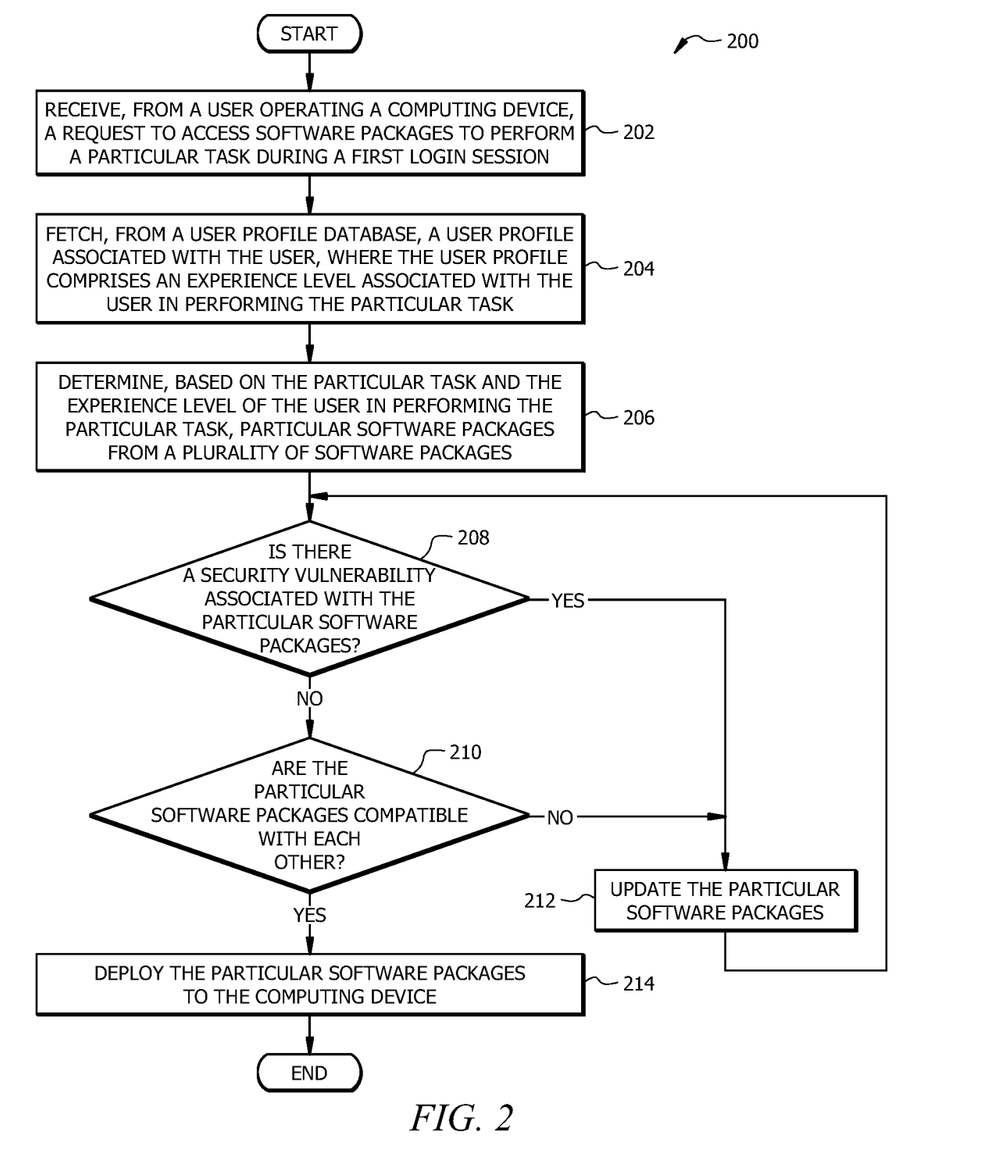
FIG. 2 illustrates an example flowchart of a method for detecting security vulnerabilities in software package deployment.

Example Method for Deploying Software Packages Based on a User Profile and User's Request FIG. 2 illustrates an example flowchart of a method 200 for deploying software packages 128 to a user 102 based on the user profile 116a and the request 104. Modifications, additions, or omissions may be made to method 200. Method 200 may include more, fewer, or other steps. For example, steps may be performed in parallel or in any suitable order. While at times discussed as the system 100, processor 142, software package analyzer 144, compatibility engine 146, or components of any of thereof performing steps, any suitable system or components of the system may perform one or more steps of the method 200. For example, one or more steps of method 200 may be implemented, at least in part, in the form of software instructions 152 of FIG. 1, stored on non-transitory, tangible, machine-readable media (e.g., memory 150 of FIG. 1) that when run by one or more processors (e.g., processor 142 of FIG. 1) may cause the one or more processors to perform steps 202-214.

Method 200 begins at step 202 where the software package analyzer 144 receives, from a user 102 operating a computing device 130, a request 104 to access software packages 122 to perform a particular task 108. For example, the software package analyzer 144 may receive the request 104 when the user 102 specifies the request 104 from the interface application 132, similar to that described above in FIG. 1. For example, the particular task 108 may be developing a web application, developing a software application, developing a mobile application, configuring firewall protocols in network infrastructure, etc.

At step 204, the software package analyzer 144 fetches, from the user profile database 112, the user profile 114a associated with the user 102, where the user profile 116a comprises an experience level 116a associated with the user 102 in performing the particular task 108. For example, the experience level 116a associated with the user 102 may be represented on a scale of 1 to 10, similar to that described above in FIG. 1.

At step 206, the software package analyzer 144 determines, based on the particular task 108 and the experience level 116a of the user 102, one or more particular software packages 128 from a plurality of software packages 122. In this process, the software package analyzer 144 may implement the machine learning algorithm 156 to select or identify one or more particular software packages 128 that are configured to be used for performing the particular task 108. For example, the software package analyzer 144 selects the one or more particular software packages 128 that are labeled with the particular task 108, and historically used by users 102 with the experience levels 116 within a threshold range (e.g., ±1, ±2, or any suitable threshold range) from the experience level 116a associated with the user 102. For example, the software package analyzer 144 may select or identify one or more particular software packages 128 according to the policies 164 and the training dataset 158, similar to that described above in FIG. 1.

At step 208, the compatibility engine 146 determines whether there is a security vulnerability 154 associated with the particular software packages 128. In this process, the compatibility engine 146 may implement the vulnerability scanning algorithm 160 that is configured to scan the source code 172 of the particular software packages 128, and search for instances of code portions in which keywords 162 are used. Examples of security vulnerabilities 154 and keywords 162 are described in FIG. 1. If it is determined that there is no security vulnerability 154 is associated with the particular software packages 128, method 200 proceeds to step 210. Otherwise, method 200 proceeds to step 210.

At step 210, the compatibility engine 146 determines whether the particular software packages 128 are compatible with each other. In this process, the compatibility engine 146 may determine whether each of the software packages 128 crashes it is executed in conjunction with one or more of other software packages 128. For example, if the compatibility engine 146 determines that a first software package 128 crashes when it is executed in conjunction with a second software package 128, the compatibility engine 146 determines that the first software package 128 is not compatible with the second software package 128, similar to that described above in FIG. 1. If it is determined that the particular software packages 128 are compatible with each other, method 200 proceeds to step 214. Otherwise, method 200 proceeds to step 212.

At step 212, the software package analyzer 144 updates the particular software packages 128. For example, the compatibility engine 146 may send a feedback message to the software package analyzer 144 that at least one of the particular software packages 128 is associated with a security vulnerability 154 and/or at least one of the particular software packages 128 is not compatible with other software packages 128. In response, the software package analyzer 144 updates or revises one or more particular software packages 128, for example, by replacing the incompatible software package 128 and/or the software package 128 infected with the security vulnerability 154 with another software package 128 that is compatible with other software packages 128, not infected with security vulnerabilities 154, and configured to perform the particular task 108. After updating the software packages 128, method 200 returns to step 208. The steps 208 to 212 are executed by the software package analyzer 144 and compatibility engine 146 until the particular software packages 128 are free of security vulnerabilities 154 and are compatible with each other.

At step 214, the compatibility engine 146 deploys the particular software packages 128 to the computing device 130. For example, the compatibility engine 146 may communicate a container image containing the particular software packages 128 to the computing device 130, and install them. In another example, the compatibility engine 146 may establish a communication path between a remote server (e.g., a virtual machine) in which the particular software packages 128 are installed and the computing device 130.

Figure 3:
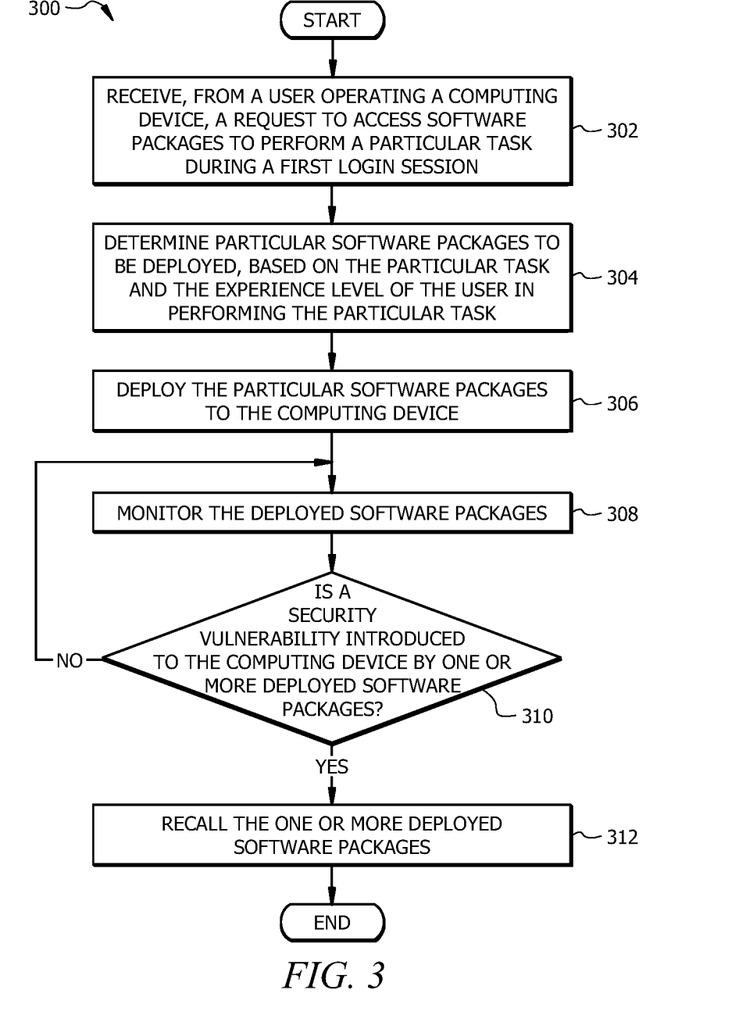
FIG. 3 illustrates an example flowchart of a method for detecting security vulnerabilities in deployed software packages.

Example Method for Detecting Security Vulnerabilities in Deployed Software Packages FIG. 3 illustrates an example flowchart of a method 300 for detecting security vulnerabilities 154 in deployed software packages 128. Modifications, additions, or omissions may be made to method 300. Method 300 may include more, fewer, or other steps. For example, steps may be performed in parallel or in any suitable order. While at times discussed as the system 100, processor 142, software package analyzer 144, compatibility engine 146, or components of any of thereof performing steps, any suitable system or components of the system may perform one or more steps of the method 300. For example, one or more steps of method 300 may be implemented, at least in part, in the form of software instructions 152 of FIG. 1, stored on non-transitory, tangible, machine-readable media (e.g., memory 150 of FIG. 1) that when run by one or more processors (e.g., processor 142 of FIG. 1) may cause the one or more processors to perform steps 302-312.

Method 300 begins at step 302 where the software package analyzer 144 receives, from a user 102 operating a computing device 130, a request 104 to access software packages 122 to perform a particular task 108 during a first login session 106. For example, the software package analyzer 144 may receive the request 104 when the user 102 specifies the request 104 from the interface application 132, similar to that described above in FIG. 1. For example, the particular task 108 may be developing a web application, developing a software application, developing a mobile application, configuring firewall protocols in network infrastructure, etc.

At step 304, the software package analyzer 144 determines particular software packages 128 from the plurality of software packages 122 to be deployed to the computing device 130, based on the particular task 108 and the experience level 116a associated with the user 102 in performing the particular task 108. In this process, the software package analyzer 144 fetches, from the user profile database 112, the user profile 114a associated with the user 102. For example, the experience level 116a associated with the user 102 may be represented on a scale of 1 to 10, similar to that described above in FIG. 1. The software package analyzer 144 may implement the machine learning algorithm 156 to select or identify one or more particular software packages 128 that are configured to be used for performing the particular task 108. For example, the software package analyzer 144 selects the one or more particular software packages 128 that are labeled with the particular task 108, and historically used by users 102 with the experience levels 116 within a threshold range (e.g., ±1, ±2, or any suitable threshold range) from the experience level 116a associated with the user 102. The software package analyzer 144 may select or identify one or more particular software packages 128 according to policies 164 and the training dataset 158, similar to that described above in FIG. 1.

At step 306, the compatibility engine 146 deploys the particular software packages 128 to the computing device 130. For example, the compatibility engine 146 may communicate a container image containing the particular software packages 128 to the computing device 130, and remotely install them. In another example, the compatibility engine 146 may establish a communication path between a remote server (e.g., a virtual machine) in which the particular software packages 128 are installed and the computing device 130.

At step 308, the compatibility engine 146 monitors the deployed software packages 128. For example, the compatibility engine 146 may monitor the deployed software packages 128 and determine whether a deployed software package 128 crashes if it is executed in parallel with any other software package 128 (and/or any software package already installed on the computing device 130), similar to that described in FIG. 1.

In another example, the compatibility engine 146 may monitor and determine whether any software package already installed on the computing device 130 crash if a deployed software package 128 is executed in parallel with any other software package 128 (and/or any software package already installed on the computing device 130), similar to that described in FIG. 1.

In one embodiment, the compatibility engine 146 may also monitor the performance of the deployed software packages 128. For example, the compatibility engine 146 may monitor the speed, CPU utilization usage, memory utilization usage, and other performance parameters of deployed software packages 128, similar to that described in FIG. 1.

At step 310, the compatibility engine 146 determines whether a security vulnerability 154 is introduced to the computing device 130 by one or more of the deployed software packages 128. In this process, the compatibility engine 146 may implement the vulnerability scanning algorithm 160 that is configured to scan the source code 172 of the particular software packages 128, and search for instances of code portions in which keywords 162 are used. Examples of security vulnerabilities 154 and keywords 162 are described in FIG. 1. If it is determined that a security vulnerability 154 is introduced to the computing device 130 by one or more of the deployed software packages 128, method 300 proceeds to step 312. Otherwise, method 300 returns to step 308, where the compatibility engine 146 continues to monitor the deployed software package 128.

At step 312, the compatibility engine 146 recalls the one or more deployed software packages 128. For example, the compatibility engine 146 may remotely uninstall the one or more deployed software packages 128 from the computing device 130. In another example, the compatibility engine 146 may terminate the communication path between the remote server (e.g., a virtual machine) on which the deployed software packages 128 are installed and the device 130 and a virtual machine.

In one embodiment, the compatibility engine 146 may further determine whether the performance of a deployed software package 128 is reduced below a threshold percentage 174 (e.g., below 80%, 85%, etc.). If the compatibility engine 146 determines that the performance of the deployed software package 128 is reduced below the threshold percentage 174, the compatibility engine 146 may send a message to the user 102 operating the computing device 130 indicating that the performance of the deployed software package 128 is reduced below the threshold percentage 174, and/or recall or remotely uninstall the deployed software package 128.

In one embodiment, before recalling the deployed software packages 128, the compatibility engine 146 may communicate and remotely install a security patch 178 on the computing device 130 to address the security vulnerability 154 by updating the deployed software package 128 that introduced the security vulnerability 154 to the computing device 130, similar to that described in FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for determining a software package for deployment based on a user request, comprising:
    a memory operable to store a plurality of software packages; and
    a processor, operably coupled with the memory, configured to:
        receive a request to access software packages to perform a particular software development task during a first login session associated with a user, wherein the particular software development task comprises at least one of developing a web application and developing a software application;
        fetch, from a database, a user profile associated with the user, wherein the user profile comprises an experience level associated with the user in performing the particular software development task;
        determine, based at least in part upon the particular software development task and the experience level of the user in performing the particular software development task, one or more particular software packages from the plurality of software packages that are used for performing the particular software development task and historically used by users with the determined experience level, wherein each of the determined one or more particular software packages is configured to be used for performing the particular software development task;
        determine whether a security vulnerability is associated with the one or more particular software packages, by:
            scanning source code of the one or more particular software packages; and
            determining if a portion of the source code includes an open communication port vulnerable to unauthorized access; and
        in response to determining that no security vulnerability is associated with the one or more particular software packages, deploy the one or more particular software packages to a computing device associated with the user.

2. The system of claim 1, wherein the processor is further configured to:
    determine whether each software package from the one or more particular software packages is compatible with other software packages installed on the computing device; and
    in response to determining that each software package from the one or more particular software packages is compatible with the other software packages, deploy the one or more particular software packages to the computing device.

3. The system of claim 1, wherein the processor is further configured to:
    after deploying the one or more particular software packages to the computing device, monitor a performance of the one or more particular software packages;
    determine whether the performance of the one or more particular software packages is reduced below a threshold percentage, wherein the performance of the one or more particular software packages is reduced below the threshold percentage if a speed of executing the particular software development task using the one or more particular software packages is reduced below the threshold percentage; and
    in response to determining that the performance of the one or more particular software packages is reduced below the threshold percentage, recall the one or more particular software packages from the computing device such that the one or more particular software packages are uninstalled from the computing device.

4. The system of claim 1, wherein the processor is further configured to:
    detect the end of the first login session in conjunction with the user being logged out from the computing device; and
    in response to detecting the end of the first login session, recall the one or more particular software packages from the computing device such that the one or more particular software packages are uninstalled from the computing device.

5. The system of claim 1, wherein the processor is further configured to:
    after deploying the one or more particular software packages to the computing device, determine whether any security vulnerability is introduced by the one or more particular software packages to the computing device; and
    in response to determining that at least one security vulnerability is introduced to the computing device, recall the one or more particular software packages from the computing device such that the one or more particular software packages are uninstalled from the computing device.

6. The system of claim 1, wherein the processor is further configured to:
    receive a second request to perform the particular software development task during a second login session;
    determine whether the experience level of the user has changed;
    in response to determining that the experience level of the user has changed, select one or more second software packages from the plurality of software packages based at least in part upon the determined change in the experience level of the user; and
    deploy the one or more second software packages to the computing device.

7. The system of claim 1, wherein deploying the one or more particular software packages comprise:
    communicating the one or more particular software packages to the computing device; and
    remotely installing the one or more particular software packages on the computing device.

8. The system of claim 1, wherein deploying the one or more particular software packages comprises establishing a communication path between a remote computing device on which the one or more particular software packages are installed and the computing device, such that the one or more particular software packages are accessible to the user at the computing device.

9. A method for determining a software package for deployment based on a user request, comprising:
    receiving a request to access software packages to perform a particular software development task during a first login session associated with a user, wherein the particular software development task comprises at least one of developing a web application and developing a software application;
    fetching, from a database, a user profile associated with the user, wherein the user profile comprises an experience level associated with the user in performing the particular software development task;
    determining, based at least in part upon the particular software development task and the experience level of the user in performing the particular software development task, one or more particular software packages from a plurality of software packages that are used for performing the particular software development task and historically used by users with the determined experience level, wherein each of the determined one or more particular software packages is configured to be used for performing the particular software development task;
    determining whether a security vulnerability is associated with the one or more particular software packages, by:
        scanning source code of the one or more particular software packages; and
        determining if a portion of the source code includes an open communication port vulnerable to unauthorized access; and
    in response to determining that no security vulnerability is associated with the one or more particular software packages, deploying the one or more particular software packages to a computing device associated with the user.

10. The method of claim 9, further comprising:
    determining whether each software package from the one or more particular software packages is compatible with other software packages installed on the computing device; and
    in response to determining that each software package from the one or more particular software packages is compatible with the other software packages, deploying the one or more particular software packages to the computing device.

11. The method of claim 9, further comprising:
    detecting the end of the first login session in conjunction with the user being logged out from the computing device; and
    in response to detecting the end of the first login session, recalling the one or more particular software packages from the computing device such that the one or more particular software packages are uninstalled from the computing device.

12. The method of claim 9, further comprising:
    after deploying the one or more particular software packages to the computing device, determining whether any security vulnerability is introduced by the one or more particular software packages to the computing device; and
    in response to determining that at least one security vulnerability is introduced to the computing device, recalling the one or more particular software packages from the computing device such that the one or more particular software packages are uninstalled from the computing device.

13. The method of claim 9, further comprising:
    receiving a second request to perform the particular software development task during a second login session;
    determining whether the experience level of the user has changed;
    in response to determining that the experience level of the user has changed, selecting one or more second software packages from the plurality of software packages based at least in part upon the determined change in the experience level of the user; and
    deploying the one or more second software packages to the computing device.

14. The method of claim 9, wherein deploying the one or more particular software packages comprise:
    communicating the one or more particular software packages to the computing device; and
    remotely installing the one or more particular software packages on the computing device.

15. The method of claim 9, wherein deploying the one or more particular software packages comprise establishing a communication path between a remote computing device on which the one or more particular software packages are installed and the computing device, such that the one or more particular software packages are accessible to the user at the computing device.

16. A computer program comprising executable instructions stored in a non-transitory computer-readable medium that when executed by a processor, causes the processor to:
    receive a request to access software packages to perform a particular software development task during a first login session associated with a user, wherein the particular software development task comprises at least one of developing a web application and developing a software application;
    fetch, from a database, a user profile associated with the user, wherein the user profile comprises an experience level associated with the user in performing the particular software development task;
    determine, based at least in part upon the particular software development task and the experience level of the user in performing the particular software development task, one or more particular software packages from a plurality of software packages that are used for performing the particular software development task and historically used by users with the determined experience level, wherein each of the determined one or more particular software packages is configured to be used for performing the particular software development task;
    determine whether a security vulnerability is associated with the one or more particular software packages, comprising:
        scanning source code of the one or more particular software packages; and
        determining if a portion of the source code includes an open communication port vulnerable to unauthorized access; and
    in response to determining that no security vulnerability is associated with the one or more particular software packages, deploy the one or more particular software packages to a computing device associated with the user.

17. The computer program of claim 16, wherein the instructions when executed by the processor, further cause the processor to:
  determine whether each software package from the one or more particular software packages is compatible with other software packages installed on the computing device; and
  in response to determining that each software package from the one or more particular software packages is compatible with the other software packages, deploy the one or more particular software packages to the computing device.

18. The computer program of claim 16, wherein the instructions when executed by the processor, further cause the processor to:
  detect the end of the first login session in conjunction with the user being logged out from the computing device; and
  in response to detecting the end of the first login session, recall the one or more particular software packages from the computing device such that the one or more particular software packages are uninstalled from the computing device.

19. The computer program of claim 16, wherein the instructions when executed by the processor, further cause the processor to:
  after deploying the one or more particular software packages to the computing device, determine whether any security vulnerability is introduced by the one or more particular software packages to the computing device; and
  in response to determining that at least one security vulnerability is introduced to the computing device, recall the one or more particular software packages from the computing device such that the one or more particular software packages are uninstalled from the computing device.

20. The computer program of claim 16, wherein the instructions when executed by the processor, further cause the processor to:
  receive a second request to perform the particular software development task during a second login session;
  determine whether the experience level of the user has changed;
  in response to determining that the experience level of the user has changed, select one or more second software packages from the plurality of software packages based at least in part upon the determined change in the experience level of the user; and
  deploy the one or more second software packages to the computing device.

* * * * *